Feb. 27, 1962    JEAN-BAPTISTE A. DONNET    3,023,118
WATER-SOLUBLE CARBON BLACK AND PRODUCTION THEREOF
Filed Jan. 13, 1958                           2 Sheets-Sheet 1
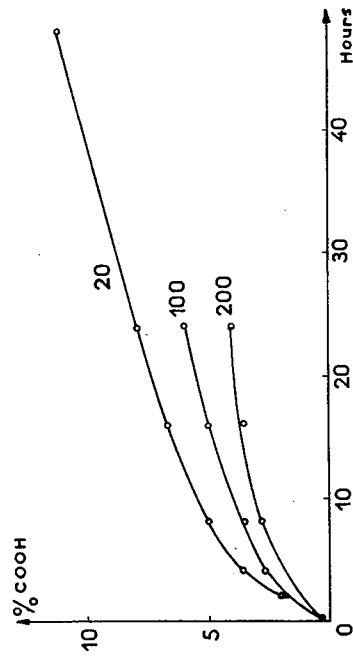
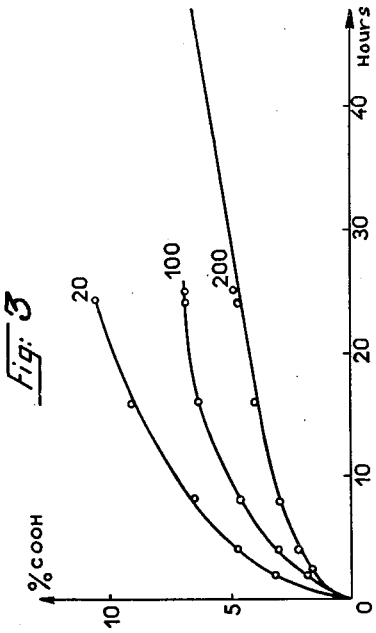
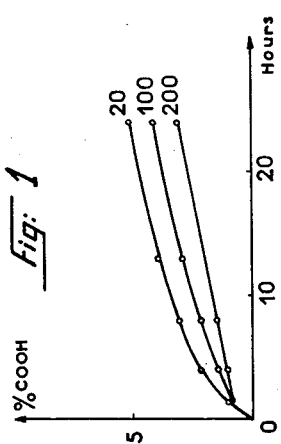
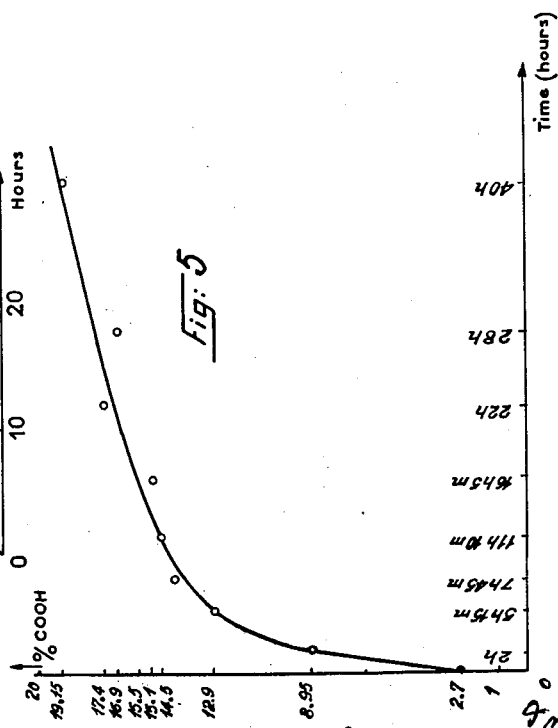

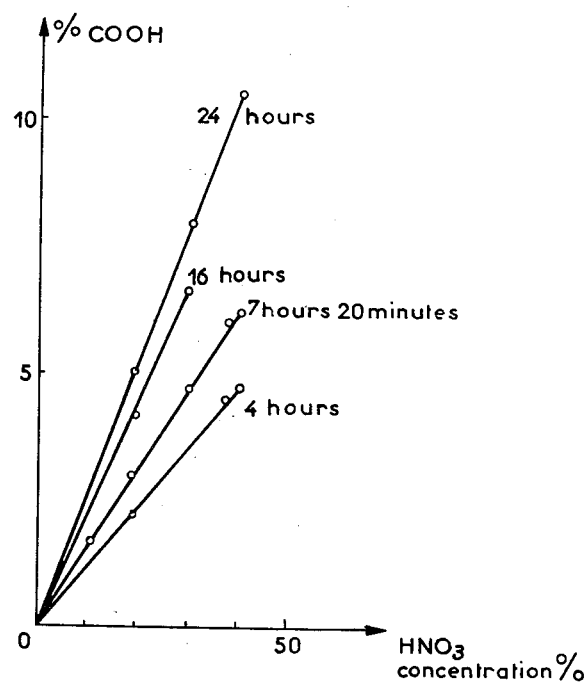

United States Patent Office 3,023,118
Patented Feb. 27, 1962

3,023,118
WATER-SOLUBLE CARBON BLACK AND
PRODUCTION THEREOF
Jean-Baptiste Alexis Donnet, Mulhouse-Dornach, Haut-Rhin, France, assignor to Societe d'Etude des Industries du Petrole au Port de Strasbourg (Societe a Responsabilite Limitee), Bas-Rhin, France, a company of France
Filed Jan. 13, 1958, Ser. No. 708,634
Claims priority, application France Jan. 16, 1957
5 Claims. (Cl. 106—307)

Carbon black as commercially manufactured at this time is an extremely divided substance consisting of particles the size of which may range from about ten to a few thousands of angstroms according to the process of manufacture, the particles having however a common character, that of being definitely organophilic and not yielding stable aqueous suspensions.

The production of stable aqueous solutions of carbon black has been effected to this day by adding a dispersing agent such as a sodium salt of lignin or a lignosulphonic or naphthalene sulphonic acid or the like; such agents adsorbed on the surface of the black impart a hydrophlic character thereto. It is that technique which has been mostly used for producing master batches from carbon black and rubber latex.

Another technique is described by Godfrey L. Cabot in the U.S. Patent No. 2,439,442 of April 13, 1948; according to the same, an aqueous solution of an alkali metal hypochlorite is reacted with carbon black, which thereby becomes water-soluble.

I have now found that generaly any suitable oxidizing treatment enables of converting carbon black to a hydrophlic product which disperses in water, yielding a stable aqueous solution, owing to the creation on the surface thereof, of chemicaly estimable, oxygen-containing, hydrophilic groups which impart water solubility to the carbon black particles.

I have further found that among the oxidizing agents I have experimented, nitric acid in aqueous solution is to be placed on the foreground by reason of its low cost, its effectiveness for the purpose aimed at and the easiness of carrying oxidation into effect with the same.

However, according to my invention, other oxidizing agents may be employed successfully, firstly hydrogen peroxide which is however more expensive, than potassium permanganate, potassium chromate, potassium bichromate, sodium chlorate, persulphuric acid and other oxidizing agents.

It has already been proposed to oxidize carbon by means of nitric acid but under conditions selected to produce a violent attack, with a view to obtaining mellitic acid (benzene hexacarboxylic acid); thus concentrated nitric acid (specific gravity 1.5) has generally been employed in great excess (1,600 to 1,800 ml. per each 200 g. of carbon), usually in the presence of a catalyst such as vanadic acid.

On the contrary as will be particularly described, I effect an intendedly careful oxidation, particularly with diluted nitric acid and with a restricted amount thereof where nitric acid is employed as an oxidizing agent.

According as it is desired to alter the chemical structure of carbon black particle surface to a more or less marked degree, the oxidizing solution will be caused to act for a longer or shorter period, and the bath ratio (amount of black:volume of oxidizing bath) may also be varied over a wide range.

I have found that for industrial practice, the concentration of nitric acid may be varied from 19 to 40% by weight, with an amount of carbon black varying from 20 to 200 grams for 500 ml. of bath and an oxidation period varying from 2 to 24 hours, while obtaining water-soluble carbon black in all instances; the most favorable temperatures are those above 50° C. and in practice it is preferred to work at boiling temperature, so that stirring may be dispensed with and oxidation may be carried out very easily. With n limits defined as above the chemical nature of the carbon black surface will obviously be altered to a greater degree as the concentration of oxidizing agent will be higher and the oxidation period longer, and also as the amount of starting carbon black will be smaller.

It should be understood that the limits above mentioned for concentration are not restrictive; thus aqueous solutions containing less than 11% by weight of $HNO_3$ are still capable of producing water-soluble carbon blacks, providing oxidation is carried out for a long enough period. Also aqueous solutions containing more than 40% by weight of $HNO_3$ may also be employed; even pure nitric acid may be resorted to. However concentrated solutions act rather violently and a very short treatment should be carried out to avoid a loss of starting material through oxidizing destruction. Accordingly it is preferred to employ diluted aqueous solutions of nitric acid so as to effect only a surface oxidation of the particles.

The results above set forth are obtained whatever the starting carbon black may be. Nevertheless I have found that the amount of oxidizing agent to be employed under predetermined conditions for obtaining a predetermined result vary in the same direction as the specific area of the starting carbon black. Thus either carbon black "Philblack O" or carbon black "Vulcan 3" may be employed as a starting material without significant difference in the results, but where carbon black "Carbolac" is employed (the specific area thereof being much greater) it is necessary with a view to obtaining the same results as with the first two materials, for example to prolong the oxidation period while maintaining the same other condtions or, all other conditions being the same, to employ a more concentrated aqueous solution of nitric acid.

The carbon black oxidized in an aqueous solution by means of any one of the oxidizing agents above mentioned should be thoroughly freed from foreign ions capable of interfering with the dissolution thereof. It is indeed important to realize that oxidized carbon black particles behave as they are suspended in water, in accordance with the anticipations of colloidal chemisty. In particular they are capable of being flocculated by cations since through dissociation of their surface chemical groups as produced by oxidation, they will be negatively charged.

Where oxidation is carried out with oxidizing agents yielding polyvalent cations in solution, it is necessary to wash the oxidized carbon black very carefully with a view to dispersing the same suitably in water; such is the case, amongst others, with carbon black oxidized with potassium chromate, bichromate or permanganate. Instead of washing with water, washing with alkalinized water may be effected.

Aqueous solutions of oxidized carbon black are also flocculated, setting apart salt additions, by additions of great enough amounts of strong acids, so that the stability thereof is generaly much lowered if the pH falls below 3–4 while the stability is perfect in the alkalinity range and is practically secured from a pH of about 5–6.

For the foregoing reason it is highly desirable to wash with water very carefully the products obtained by oxidation in acid medium, so as to remove any trace of residual acid to as thorough as possible an extent.

The uses to which water-soluble carbon blacks produced in accordance with my invention are numerous:

A first group of uses is related to the fact that the oxidized carbon black can be dispersed much more easily than untreated carbon black into rubber, whether natural or synthetic, when incorporated therein on a roller mill or in a mixer; it is also better dispersible into coating mixtures such as paints, lacquers and varnishes.

Aqueous solutions of oxidized carbon black directly give a printing ink, both for paper and textiles.

A suspension of oxidized carbon black may also be mixed as such with a latex of natural or synthetic rubber, yielding a particularly intimate mixture which after coagulating and drying, enables of obtaining a master batch.

Finally undried oxidized carbon black pasty masses may be employed for all uses in which colloidal graphite, much more expensive to manufacture, has been employed.

A few examples will illustrate the technique adopted for producing water-soluble carbon black according to my invention.

In the examples the materials identified as "Philblack O" and "Carbolac I" were found by applicant to have the characteristics tabulated below:

| Carbon black | Specific area (sq. metres per gram) | | Average diameter of particles in angstroms | Composition (percent by weight) | | | | | | |
|---|---|---|---|---|---|---|---|---|---|---|
| | Electronic microscope | B.E.T. | | C | O | H | N | Cl | S | Ashes |
| Philblack O | 82 | 75 | 295 | 96.87 | 1.17 | 0.46 | 0.13 | 0.07 | 0.52 | 0.30 |
| Carbolac I | 264 | 1,000 | 106 | | 11.63 | 0.56 | | | | |

NOTE.—"B.E.T." means the method devised by Brunauer, Emmet and Teller (Journal of the American Chemical Society 60, 309, 1938).

EXAMPLE 1

100 grams of carbon black "Philback O" were suspended in 500 ml. of aqueous nitric acid having a concentration of 30 percent by weight, and the suspension boiled to reflux for 4 hours. Heating being discontinued after 4 hours of mild boiling, the carbon black was allowed to settle, the supernatant liquid sucked off and replaced by water. After another decantation, the supernatant layer was again sucked off and the same process repeated. After a small number of decantations, there was obtained a suspension which did not decant within acceptable periods.

The whole was filtered in vacuo and the filtered oxidized black was washed on the filter.

Instead of so doing, it is preferred in industrial practice to work in a centrifugal draining machine, so that the oxidized carbon black can be washed continuously. Washing was continued until no trace of $NO_3^-$ ion was detectable with brucine, when generally wash water blackened definitely as the carbon black began to pass spontaneously into solution. At the end of the washing period, the pH-value of washing water was of the order of 5–6.

The pasty mass collected at the end of the filtering process became dispersed in water simply upon contacting therewith and after stirring yielded a stable suspension. The water content of the pasty mass depended on the effectiveness of the draining apparatus. If required the pasty mass could be dried at a low temperature, for example at about 60° C., in an air oven. The black thus obtained was dry, hard and brittle; it could then be ground finely before use and kept the property of redispersing thoroughly into water, yielding very stable suspensions particularly in alkaline medium.

EXAMPLE 2

100 grams of black "Philblack O" were suspended in 500 ml. of aqueous nitric acid containing 19 percent by weight of nitric acid, and the whole boiled to reflux for 8 hours.

The sequence of operations after heating was discontinued, was exactly the same as in Example 1.

A black having characteristics of solubility and surface structure fairly similar to those of the black produced according to Example 1 was obtained.

EXAMPLE 3

500 mg. of carbon black were treated at room temperature with 20 ml. of 30 percent aqueous solution of hydrogen peroxide, the mixture having been adjusted to pH 1 by means of sulphuric acid. After a few hours of treatment, the carbon black was solubilized.

EXAMPLE 4

500 mg. of carbon black were treated at room temperature with 10 ml. of a N/10 aqueous solution of potassium permanganate in acid medium (8 N sulphuric acid). After a few hours, the colour of permanganate disappeared.

EXAMPLE 5

20 grams of carbon black were treated with a normal solution of potassium permanganate in acid medium (4 N sulphuric acid). The color of permanganate rapidly vanished. After an hour, the whole amount of permanganate had reacted. The carbon black obtained after filtering and carefully washing was soluble in water.

EXAMPLE 6

500 mg. of carbon black were treated with 25 ml. of an aqueous solution of potassium bichromate having a pH 1 (sulphuric acid); the mixture was left reacting for a few hours, then filtered and washed; a water-soluble black was thus obtained.

EXAMPLE 7

20 grams of carbon black were treated with 500 ml. of a N/5 aqueous solution of potassium persulphate in acid medium (4 N sulphuric acid) at 80° C. for 6 hours. The black was filtered and washed; a water-soluble black was thus obtained.

My invention comprises water-soluble carbon blacks produced as above described, the aqueous suspensions thereof which have a pH value above 5, and materials containing the same.

The new water-soluble blacks according to this invention consist of particles having an average diameter between about ten angstroms and a few microns, the core thereof being carbon while the surface thereof shows a special molecular structure capable of imparting water solubility.

The structure just referred to is characterized, in particular, by the presence of hydrophilic chemical groups which can be estimated on account of their being fit to release acetic acid from an aqueous solution of calcium acetate. Assuming that the result of estimation of acetic acid freed by an oxidized carbon black is reckoned for example in terms of gram-equivalents of such groups, and further assuming that all freed acetic acid is made free by said groups to which a formula of the type X—OH will be ascribed (wherein X denotes a radical which may contain carbon, oxygen and hydrogen), I have found that by means of a treatment with nitric acid according to this invention, products are obtained which contain from 1 to more than 10 percent by weight of X—OH groups, where the starting material is a carbon black of the type "Philblack O" and oxidation conditions are varied as above set forth. The maximum percentage mentioned above is not a limit; the curve representing the hydrophilic group content of oxidized carbon black as a function of the oxidation period or the concentration of aqueous nitric acid or the bath ratio does not tend towards a definite limit.

By treating the same carbon black "Philblack O" with sodium hypochlorite according to the known treatment, it is hardly possible to obtain more than 2 or 3% of X—OH groups.

Generally speaking, water-solubility and stability of aqueous solutions obtained from oxidized carbon black increase as the percentage of surface X—OH groups is higher.

The foregoing examples are not of limiting character and, in particular, the conditions in which oxidation is carried out may be varied without departing from the spirit of this invention.

This invention is generally applicable to the treatment of carbon particles, especially those having a small average diameter, not above a few microns.

So far as the X—OH groups above referred to are concerned, I have found them to be —COOH-groups and OH-groups which behave normally towards conventional reagents for such groups.

The various oxidizing agents above mentioned are all capable of generating such surface groups, which are responsible for the new properties of carbon blacks containing the same, particularly a highly marked hydrophilic character, whereby stable aqueous suspensions may be obtained as soon as there are enough such groups.

In addition to that hydrophilic character, the carbon blacks containing carboxy and hydroxy groups, which will hereinafter be referred to as "carboxy-hydroxy carbon blacks," exhibit marked ion exchange properties, more precisely cation exchange properties, which are apparent in particular from the release of free acetic acid where calcium acetate is added to an aqueous suspension of carboxy-hydroxy carbon black, or again from the definite fall of pH in any salt solution to which carboxy-hydroxy black is added.

It is pointed out that the hydroxy and carboxy groups formed on the surface of carbon black particles according to this invention were found to react as such groups usually do, so that by causing said groups to react with specific reactants, for example with diazomethane or thionyl chloride, as it will be described later on herein, it is possible to obtain further carbon black varieties that I believe to be entirely new.

As to the surface group content, an estimation of such groups shows that while the proportion of COOH-groups may be varied as desired over quite a wide range, for a giving starting carbon black, on the contrary the proportion of OH-groups seems to remain stationary for a given starting carbon black, whatever the conditions of the oxidation process may be.

Hence, the proportion of surface OH-groups reaches a stationary limit very quickly; thus, for example, with commercial carbon black "Monarch 71", I have found that while with oxidation conditions that were widely varied, the content of surface COOH-groups increases from 0.97 to 6.3 grams of COOH per 100 grams of carbon black subjected to treatment, the content of surface OH-groups generated during the same treatment remains substantially unaltered, being of the order of 0.4 gram of OH per 100 grams of carbon black subjected to treatment.

In view of the largely predominating proportion of COOH-groups and also the feasibility of varying the same easily, it is by the content of COOH-groups that a treated carbon black will be characterized in the examples given below, provided however OH-groups are also present on the surface but by a relative proportion which is smaller as oxidation is carried out farther.

With a view to characterizing a carbon black as obtained after an oxidizing treatment, I shall resort to the method according to which, as above explained, I estimate acetic acid freed from an aqueous solution of calcium acetate contacted for a protracted period with the tested carbon black.

In such a process (Lüdtke), acetic acid is set free by surface COOH-groups on the carbon black, which fix $Ca^{++}$ ions at the expense of calcium acetate, thereby liberating $CH_3COOH$ by an amount proportional to the amount of COOH-groups in presence. The method has been employed for a long time in estimating COOH-groups as present in oxycelluloses and I have checked that it is applicable rightfully for estimating surface COOH-groups on an oxidized carbon black.

The amount of COOH-groups, expressed in grams of COOH per 100 grams of oxidized carbon black, was calculated from the result of estimation with calcium acetate, and it is that amount which will be hereinafter referred to, except mention to the contrary. The estimating operation was carried out as follows: the amount of carbon black to be tested (about 1 gram) was put in 25 ml. of water plus 25 ml. of an aqueous solution of $Ca(CH_3COO)_2$ containing 12.6 grams of the same per litre. The mixture was refluxed for 24 hours, and in a sample of clear liquid obtained after cooling and settling of the mixture generally left standing for 24 hours after the end of heating, acetic acid as set free was estimated by means of a N/50 aqueous solution of NaOH in the presence of phenolphthalein.

Nitric acid oxidation of carbon black was carried out as follows:

Carbon black was dispersed in an aqueous solution of $HNO_3$ at the selected concentration, in a nitric acid resisting apparatus.

The mixture was heated to boiling, and refluxed for the desired period, boiling being sufficient to provide for satisfactory stirring and homogeneity of the bath.

As a rule, carbon black was firstly placed in the apparatus, and the nitric acid solution introduced thereafter. The reaction time was computed from the beginning of boiling to the stopping of heating.

After heating was discontinued, the bath was allowed to cool, and the cold suspension filtered.

By reason of the acidity of the medium, the oxidized carbon black was largely flocculated in the bath and thereby filtration could be effected without special difficulties.

After filtration by means of which the major part of the oxidizing bath was removed, the oxidized carbon black was purified by putting the same into pure water, stirred for dispersion therein then left to settle.

After decantation, the supernatant liquid was sucked off and replaced by pure water, the carbon black redispersed by stirring then again allowed to settle. By means of such successive decantations and renewals of water, residual nitric acid was removed until the carbon black could be dispersed spontaneously in water and did not settle down in appreciable periods. The pH-value of the supernatant solution was then of the order of 4 to 5.

In usual practice a small number of decantations was found to be enough for obtaining that result.

The aqueous suspension of carbon black was then evaporated to thorough dryness on a water-bath, this procedure corresponding to the best conditions for separating the carbon black from the very diluted aqueous solution of $HNO_3$; the carbon black was recovered in crumbly form very easy to grind.

I have found that the percentage of COOH-groups generated on the surface of carbon black by the above treatment depends for a given carbon black:

On the duration of oxidation,
On the concentration of the bath in oxidizing agent,
On the concentration of the bath in carbon black.

The influence of the duration of oxidation, all other things being the same, is considerable and by way of example, I shall indicate the percentage of surface COOH-groups obtained by treating either 20 or 100 or 200 grams of carbon black "Philblack O" with 500 ml. of an aqueous solution of nitric acid, the concentrations of which being respectively 19% by weight (Table I and FIG. 1), 30% by weight (Table II and FIG. 2) and 40% by weight (Table III and FIG. 3).

As apparent from the curves of FIGS. 1, 2 and 3, the percentage of COOH-groups regularly increases as the duration of reaction increases, and I point out that the proportion of 11% for COOH-groups which is the highest among the results tabulated and plotted does not seem to be an upper limit. However too long a period of oxidation results in an attack which is not restricted to the surface alone.

The influence of the bath concentration in nitric acid is also important. Table IV and FIG. 4 show the percentage of COOH-groups as can be obtained by effecting the treatment with increasing concentrations of $HNO_3$.

In all cases, the oxidizing bath had a total volume of 500 ml. per 20 grams of carbon black and the concentrations of $HNO_3$ were by weight. The table indicates results of experiments which were carried out with 4 different reaction periods, viz. 4 hours, 7 hours 20 minutes, 16 hours and 24 hours.

It will be seen that for the same reaction period and the same content of the bath in carbon black, the percentage of COOH-groups was proportional to the $HNO_3$ concentration as the latter varied from 0 to 40%.

It should be understood that it is possible to obtain carboxy-hydroxy carbon black by employing nitric acid at a higher concentration, within the scope of this invention; also in that case, account should be taken of the attack which is not restricted to a surface oxidation and I have found that with concentrations in $HNO_3$ above 45%, such an attack becomes significant.

As an example of the influence of $HNO_3$ concentration, I shall point out that all other things being the same and as also it may be checked from the data in the tables, an increase of $HNO_3$ concentration from 19% to 30% results in a multiplication of the number of COOH-groups generated on the surface by oxidation, by a factor of about 1.6. Also an increase of $HNO_3$ concentration from 30% to 40% multiplies the number of COOH-groups by a factor of about 1.3.

The results just referred to are illustrated by FIG. 4.

Furthermore as regards the influence of the bath concentration in carbon black, the results above mentioned show that the proportion of surface COOH-groups is substantially inversely proportional to the bath concentration in carbon black, all other things being the same.

Thus as an example, a decrease of the amount of carbon black from 100 grams to 20 grams in 500 ml. of a bath having the same $HNO_3$ concentration results in a multiplication of the percentage of COOH-groups by a factor of 1.35–1.40, the oxidation being carried out in both cases at the same temperature and for the same period.

TABLE I.—PERCENTAGE OF COOH-GROUPS OBTAINED BY TREATING "PHILBLACK O" WITH $HNO_3$ AT A CONCENTRATION OF 19 PERCENT

| Duration of oxidation | Weight of carbon black in 500 ml. | | |
|---|---|---|---|
| | 20 grams | 100 grams | 200 grams |
| 1 h. 30 m. | 1.12 | 0.89 | 0.94 |
| 4 h. 10 m. | 2.19 | 1.5 | 1.15 |
| 8 h. | 3.06 | 2.18 | 1.55 |
| 13 h. | 3.87 | 2.9 | 2.05 |
| 24 h. | 5.02 | 4 | 3.12 |

TABLE II.—PERCENTAGE OF COOH-GROUPS OBTAINED BY TREATING "PHILBLACK O" WITH $HNO_3$ AT A CONCENTRATION OF 30 PERCENT

| Duration of oxidation (hours) | Weight of carbon black in 500 ml. | | |
|---|---|---|---|
| | 20 grams | 100 grams | 200 grams |
| 2 | 1.85 | 1.96 | 1.31 |
| 4 | 3.62 | 2.64 | 1.93 |
| 8 | 5.02 | 3.55 | 2.86 |
| 16 | 6.72 | 4.95 | 3.54 |
| 24 | 7.92 | 5.96 | 4.10 |
| 48 | 11 | | |

TABLE III.—PERCENTAGE OF COOH-GROUPS OBTAINED BY TREATING "PHILBLACK O" WITH $HNO_3$ AT A CONCENTRATION OF 40 PERCENT

| Duration of oxidation (hours) | Weight of carbon black in 500 ml. | | |
|---|---|---|---|
| | 20 grams | 100 grams | 200 grams |
| 2 | 3.2 | 2 | 1.5 |
| 4 | 4.7 | 3.2 | 2.15 |
| 8 | 6.65 | 4.6 | 3 |
| 16 | 8 | 6.3 | 3.9 |
| 24 | 10.5 | 6.85 | 4.65 |
| 25 | | 6.90 | 4.85 |
| 48 | | | 6.6 |

TABLE IV.—INFLUENCE OF BATH CONCENTRATION ON THE PERCENTAGE OF COOH-GROUPS

| $HNO_3$ conc. in aqueous sol. (percent) | Percent COOH after 4 h. | Percent COOH after 7 h. 20 m. | Percent COOH after 16 h. | Percent COOH after 24 h. |
|---|---|---|---|---|
| 11 | | 1.66 | | |
| 19 | 2.15 | 2.95 | 4.2 | 5 |
| 30 | 3.62 | 4.7 | 6.72 | 7.92 |
| 38 | | 6 | | |
| 40 | 4.7 | 6.3 | | 10.5 |

Again, all other things being the same, a decrease of the carbon black content of a 500 ml. oxidizing bath, from 200 grams to 100 grams results in a multiplication of the number of COOH-groups by a factor of 1.40 to 1.45.

The influence of the specific area of carbon black particles should also be accounted for.

I have found that the smaller the diameter of elementary particles constituting the carbon black, i.e. the greater the surface area per each gram of carbon black, the higher is the percentage of surface COOH-groups obtained from an oxidizing treatment.

As an example, FIG. 5 shows the variation of the percentage of COOH-groups as a function of the duration of treatment where "Carbolac I" (a commercial carbon black) was treated with a bath of 30 percent nitric acid, the carbon black concentration being 33.3 grams for 500 ml. of bath.

The percentage of COOH-groups increases much more quickly, all other things being the same, in the case of Carbolac I whose specific area is 264 sq. m. per gram, than in the case of "Philblack O" whose specific area is 74 sq. m. per gram.

However, it should not be deduced from the above results that a carbon black can be more easily rendered water-soluble as the carbon black is more finely divided and consists of particles having a smaller diameter.

As a matter of fact, a carbon black bearing surface COOH-groups becomes water soluble, i.e. yields with water stable suspensions which do not decant to a substantial extent after appreciable periods of time, where each carbon black particle bears from 1 to $2.10^4$ surface COOH-groups. Such a result is reached in the case of "Philblack O" for a percentage of 1.5–2% COOH-groups while in the case of "Carbolac I," as high a percentage of surface COOH-groups as 7–10% should be arrived at.

Having described a process whereby a new industrial product, viz. a carboxylated, accessorily hydroxylated carbon black or carboxy hydroxy carbon black can be produced, I shall give a few examples illustrating the normal reactivity of surface groups COOH and OH.

EXAMPLE 8

*Reaction of Carboxy Hydroxy Carbon Black With Diazomethane*

It is known that diazomethane is capable of reacting with COOH-groups and OH-groups according to the following equations:

—COOH+$N_2CH_2$→—COOCH$_3$+$N_2$

—OH+$N_2CH_2$→—OCH$_3$+$N_2$—

I could ascertain with a very large number of carboxy hydroxy carbon blacks, that the reaction thereof with diazomethane is normal.

I worked as follows:

The carboxy hydroxy carbon black obtained from the oxidizing treatment was dried then put into a flask and a few mls. of an ether solution of diazomethane were added thereto.

The reaction was immediate and brisk, nitrogen as disengaged caused a seething of ether which did not occur with untreated carbon black. The reaction was allowed to proceed on cold after the flask was closed with a stopper provided with a tube containing anhydrous calcium chloride so as to avoid any ingress of moisture into the flask.

The ether solution initially coloured in yellow by diazomethane became discoloured as could be observed after decentation of carbon black. The whole was allowed to react for a few days (at least two days), further ether solution of diazomethane being added, until no appreciable reaction with excess diazomethane could be detected.

The carbon black thus treated was filtered in vacuo, washed with ligroine and dried at 50–60° C. for 2 days.

It was easy to show the presence of OCH$_3$-groups as formed on the surface during the reaction, and showing could be made quantitatively by means of the Zeisel-Viebok method according to which the methoxylated product is treated with hydriodic acid at 140° C. and ICH$_3$ as set free is estimated.

I have found that carbon black methoxylated by means of $N_2CH_2$ actually sets free ICH$_3$ in the conditions of the Zeisel-Viebok method.

The same method even enabled me of estimating COOH- and OH-groups quantitatively and separately, by effecting estimation before and after hydrolysis with a 2 N potassium hydroxide aqueous solution, the hydrolysis being carried out with reflux for 24 hours.

The hydrolysis product did not contain any longer the methyl ester groups COOCH$_3$ which were hydrolysed while the methyl ether groups OCH$_3$ from the original hydroxy groups remained unaffected by hydrolysis.

After hydrolysis, the carbon black was washed with aqueous ethyl alcohol and finally with distilled water until no further alkaline reaction with phenolphtalein was detectable in washing waters, so as thoroughly to remove KOH adsorbed by the carbon black.

The well drained product was then dried at 50–60° C. for 2 days, and the methoxy groups OCH$_3$ in the dry product were estimated, thereby obtaining the initial percentage of hydroxy groups. From the difference with the total methoxy groups before hydrolysis, the percentage of carboxy groups was calculated.

The above reactions could be carried out without any particular difficulty.

EXAMPLE 9

*Preparation of Products Having Acid Chloride Groups From Carbon Black Containing Carboxy Groups*

It is known that from organic acids, it is possible to produce acid chlorides by reacting such acids with various chlorinating agents, out of which thionyl chloride SOCl$_2$ will be selected.

The reaction of SOCl$_2$ with the carboxy groups on carbon black should proceed as follows:

—COOH+SOCl$_2$→—COCl+SO$_2$+HCl

The best procedure I have found is as follows:

I worked in the presence of pyridine to absorb hydrochloric acid as produced during the reaction, pyridinium chloride being thereby formed, and as a dispersing medium I employed chloroform which is a solvent for thionyl chloride and pyridinium chloride.

In a round bottom flask provided with a refluxing device, I mixed up the carboxy hydroxy carbon black dried over phosphorus pentoxide, pyridine dried over potassium hydroxide and distilled, and chloroform washed with sodium carbonate then water, dried over calcium chloride and distilled.

Pure thionyl chloride was then added by small portions, and the mixture began to boil immediately. Boiling was maintained by mildly heating for 4 hours then the mixture was allowed to cool for 4 hours. It was filtered, drained and washed abundantly with for example 2 litres of chloroform per each 10 grams of carbon black, with a view to removing pyridine carefully. The carbon black was then dried in vacuo, and was found to have assumed a granular form.

It was easy to check that the carbon black thus treated contains COCl groups. As a matter of fact, it was readily hydrolyzed by water, yielding HCl by estimable amounts; it reacted with alcohols, giving esters.

By means of quantitative estimations, I could ascertain that the rate of conversion to acid chloride groups was not substantially above 40–50% with respect to the total surface carboxy groups.

Aqueous hydrolysis was easily performed and was complete, particularly in alkaline medium. The condensation with ethyl alcohol for example resulted in a yield of 76 percent.

Numerous are the uses of carboxy hydroxy carbon black, partly mentioned above:

Such blacks may be employed in admixture with rubber, either natural or synthetic; it was found in the process of incorporation that they are better dispersed than untreated carbon black. However with carboxy hydroxy carbon black, the vulcanization period should be lengthened, the more as the percentage of carboxy groups is higher. Nevertheless it is possible to obviate such an inconvenience by adding a suitable amount of a basically reacting oxide such as magnesium oxide.

Carboxy hydroxy carbon blacks can also be dispersed very readily into coating compositions; in particular they may be incorporated without any further additive to latex paints in which they are dispersed easily and with which they give black paints and varnishes.

Without any additive, concentrated aqueous solutions of carboxy hydroxy carbon blacks provide printing inks for paper and textiles. Applied according to conventional printing processes, such an ink is not washed by water alone.

A group of uses of high desirability is that resulting from the ion exchange properties which make the carboxy-hydroxy carbon blacks suitable as cation exchanging agents whose exchange capacity depends on the percentage of COOH groups and may be very great where such percentage is high. That type of ion exchanging agents has the advantage of being substantially unaffected by the pH so far as stability is concerned and of suffering no degradation in acid or alkaline medium contrary to exchanging agents of the organic resin type.

A suspension of carboxy hydroxy carbon black may be mixed as such with a rubber latex, either natural or synthetic, to give a particularly intimate mixture which after coagulating and drying enables of obtaining a master batch. With such an application in view as well as for addition to latex paints, carbon blacks having a percentage of COOH groups high enough to impart a good water solubility will be selected, i.e. carbon blacks containing 1 to $2.10^4$ COOH groups on each elementary particle.

Water-soluble carboxy hydroxy carbon back may also be employed for colouring cements, mortars and the like throughout the mass thereof. It is only necessary to incorporate the same into water as employed for making up such materials, and the same process may generally be employed for colouring aqueous masses or pastes, asbestos and the like.

Carboxy hydroxy carbon black is desirable in the manufacture of black paper and grey paper by simply incorporating the same into the pulp water. It may likewise be employed for dyeing rayon throughout the mass thereof.

Carboxy hydroxy carbon black may also be employed for finishing leather and as a water base in the production of shoe polish.

A paste having a high carboxy hydroxy carbon black content has the appearance of a grease and exhibits a high lubricating power. The paste may be employed as a lubricant particularly for uses in which aqueous suspensions of colloidal graphite which are more expensive have been employed heretofore. In particular it may be employed as a grease for glass or metal parts or as an auxiliary agent in finishing glass articles.

A further group of uses is related to the possibility of altering the surface character of carboxy hydroxy carbon blacks by chemical reaction with the COOH and/or OH groups thereof, thereby forming new chemical carbon black derivatives.

To sum up, it will be realized that my process enables of producing carboxy hydroxy carbon blacks having various contents of carboxy groups, by oxidizing carbon blacks with aqueous solutions of nitric acid containing from 1 to 40 percent by weight of $HNO_3$, at temperatures from 20° C. to the boiling point of such solutions, with carbon black contents of the oxidation bath from 1 gram per litre to the maximum compatible with homogeneity of the mixture (which depends on the size of carbon black particles to be treated), the concentrations preferably being in practice from 40 to 400 grams of carbon black per litre of nitric acid aqueous solution. Carboxy hydroxy carbon blacks may thereby be obtained which contain for example, from 0.5 to 10 percent or more of carboxy groups from "Philblack O" and 2.7 to 20 percent and more of the same from "Carbolac I," the percentages being by weight (while usual solubilized carbon blacks have a percentage of such groups between 0.1 and 0.4%), the volatile matter content being from 10 to 50 percent.

What I claim is:

1. A process for the production of a water-dispersible carbon black, which comprises the steps of maintaining a mixture of an aqueous solution of nitric acid containing from 1 to 40 percent by weight of said acid with from 1 to 400 grams of carbon black per litre of said solution, at a temperature from about 20° C. to the boiling point of said solution, for a period of about 2 to 24 hours; separating the carbon black thus treated from said aqueous solution; and removing any adherent residual nitric acid from said treated carbon black.

2. A process for the production of a water-dispersible carbon black, which comprises the steps of mildly refluxing a mixture of an aqueous solution of nitric acid containing from 19 to 40 percent by weight of said acid with from 40 to 400 grams of carbon black per litre of said solution for a period of about 2 to 24 hours; separating the carbon black thus treated from said aqueous solution; and water washing the carbon black thus separated to remove any adherent residual nitric acid therefrom.

3. The process of claim 1, which further comprises reacting said separated carbon black with excess diazomethane until no further reaction occurs.

4. The process of claim 1, which further comprises reacting said separated carbon black with thionyl chloride.

5. The water soluble carbon black product produced by the process of claim 2.

References Cited in the file of this patent

UNITED STATES PATENTS

| 91,038 | O'Reilly | June 8, 1869 |
| 1,175,958 | Karplus | Mar. 21, 1916 |
| 2,201,050 | Oberle | May 14, 1940 |
| 2,312,707 | Fuchs | Mar. 2, 1943 |
| 2,350,846 | Vogel et al. | June 6, 1944 |
| 2,439,442 | Amon et al. | Apr. 13, 1948 |
| 2,641,533 | Cines et al. | June 9, 1953 |
| 2,867,540 | Harris | Jan. 6, 1959 |
| 2,920,976 | Damusis | Jan. 12, 1960 |

OTHER REFERENCES

American Ink Maker, vol. 13, No. 3, March 1935, page 8b.

Zapp: Ind. Eng. Chem., vol. 36 (1944), pp. 128–133.

Ohkita et al.: Nippon Gomu Kyokaishi, vol. 30 (1957), pages 14–17 (in C.A., vol. 52, 5089f).

Studebaker: Rubber Chem. and Techn., vol. 30 (1957), pp. 1435–1437.

Garten et al.: Rev. Pure and Applied Chem., vol. 7 (1957), page 78.